3,291,816
DEHYDRATION OF LESQUEROLATES
Leo A. Goldblatt, New Orleans, La., and Richard E. Knowles, Pleasant Hill, Calif., assignors to the United States of America as represented by the Secretary of Agriculture
No Drawing. Filed Oct. 2, 1963, Ser. No. 313,401
6 Claims. (Cl. 260—410.7)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing $C_{20}$ dienoic acid esters by the dehydration of esters of lesquerolic acid. Further objects of the invention will be evident from the following description wherein parts and percentages are by weight unless otherwise specified.

In the course of an investigation of the chemical composition of the seeds of many less widely cultivated plants for unusual and potentially valuable constituents, which might be produced on acreage presently used for major surplus crops, it was unexpectedly discovered that the principal constituent fatty acid (about 50–60% of the extractable fatty acid content) of the seed oil of the genus Lesquerella (represented by such species as *L. lasiocarpa* and *L. lindheimerii*) was the theretofore unknown acid, 14-hydroxy-11-eicosenoic acid. This acid has been assigned the trivial name "lesquerolic acid."

In accordance with the present invention, an ester of lesquerolic acid is subjected to dehydration whereby there is produced the corresponding esters of 11,13-eicosadienoic acid and 11,14-eicosadienoic acid. The reaction which takes place, using methyl lesquerolate as an example of the starting material, may be represented by the following equation:

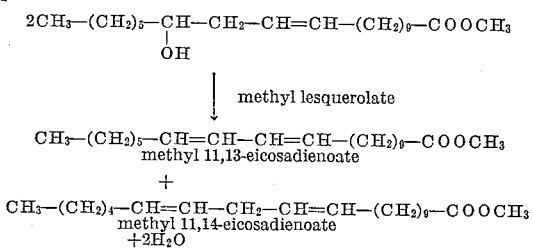

It is to be noted that 11,13-eicosadienoic and 11,14-eicosadienoic acids and their esters are new compounds, not heretofore prepared or described.

Although the methyl ester is designated above as the starting material, other esters of lesquerolic acid may be used, for instance, any of the alkyl esters such as the propyl, isopropyl, butyl, amyl, hexyl, etc. esters. Also, esters with polyhydric alcohols such as ethylene glycol or glycerine may be used. Generally, it is preferred to use Lesquerella oil, i.e., the triglyceride which contains 60 to 65% of lesquerolate. In these cases the corresponding esters of the $C_{20}$ dienoic acids are formed, e.g., ethyl lesquerolate yields ethyl esters of the $C_{20}$ dienoic acids, the triglyceride of lesquerolic acid yields triglycerides of the $C_{20}$ dienoic acids, etc.

The dehydration in accordance with the invention involves heating the lesquerolate at a temperature of about 200–250° C. in the presence of an acid dehydration catalyst, e.g., sulphuric acid, an alkali metal bisulphate, or the like. Generally, sodium bisulphate is preferred as providing excellent yields with a short processing time, i.e., about 15 to 60 minutes. The proportion of catalyst is not critical and usually there is used about 1% thereof, based on the weight of the starting material. To aid in removal of water from the system during the reaction, it is preferred to apply a vacuum. The vapor from the reaction can be condensed in conventional cooled traps and the amount of water collected furnishes a convenient index of the progress of the reaction.

Usually, in order to avoid a darkening of the material during the reaction, it is preferred to conduct a stream of an inert gas, e.g., nitrogen, over the lesquerolate undergoing dehydration. This technique is not critical to the process but does have the advantage of yielding a relatively light-colored product.

It has been found, unexpectedly, that the order in which the lesquerolate and the catalyst are mixed makes a significant effect on the yield of dienoates. Thus in the preferred embodiment of the invention, the catalyst is placed in a reaction vessel, the lesquerolic ester is poured over the catalyst and the reaction is conducted as described while continuously stirring the reaction system to keep the oil and catalyst in contact with one another. It has been observed that with this sequence of operation, the reaction goes to completion rapidly, usually in about 15–30 minutes from the time its temperature reaches the proper level for dehydration. However, where the lesquerolate is put into the vessel first and the catalyst added thereto, the dehydration proceeds at a good rate initially but then slows down markedly or even stops so that the degree of dehydration attained is significantly less, i.e., by about ¼ to ⅓, than that obtained with the preferred system.

The products of the invention are useful in preparing coating compositions, i.e., paints, varnishes, lacquers, etc. Particularly valuable in such applications is the presence of the diene configuration, especially the conjugated diene configuration of the 11,13-diene component, which gives the products excellent drying characteristics. Usually in such coating applications, one uses the glycerides of the dienoic acids prepared by dehydrating Lesquerella oil in accordance with the invention. However, alkyl esters of the dienoic acids, e.g., those prepared by dehydration of methyl lesquerolate in accordance with the invention, can be converted into esters of polyhydric alcohols such as pentaerythritol, di-pentaerythritol, etc., by conventional transesterification methods and such polyhydric alcohol esters of the dienoic acids can be employed as components of paints, varnishes, or other coating materials.

The invention is further demonstrated by the following example:

One gram of pulverized $NaHSO_4$ was placed in the bottom of a three-necked flask equipped with a stirrer, thermometer, gas ($N_2$) inlet tube, and outlet connected to a Dean-Stark trap and condenser, manometer, a Dry-Ice trap and thence to a water pump aspirator. One hundred grams of Lesquerella oil (containing ca. 65% lesquerolate) were added to the flask, stirring and heating were begun and a slow stream of nitrogen was passed over the contents of the flask. When the temperature of the liquid reached 230° C., the rate of heating was reduced and adjusted so that the temperature reached 250° C. and then remained at 250–255° C. Fifteen minutes after the liquid reached a temperature of 250° C., a sample (about ½ gram) was taken and sampling was repeated at 15-minute intervals until the reaction was discontinued, that is, at the 60th minute after reaching 250° F. During the reaction the pressure in the reaction system was 50 mm. Hg.

The course of the reaction was followed by subjecting the samples removed at 15-minute intervals to spectrometric measurements. In particular, the disappearance of lesquerolate was followed by measuring the absorbance at 2.76 microns in the infrared, characteristic of the OH group. The formation of the conjugated $C_{20}$ dienoate was followed by measuring the absorbance at 231 m$\mu$, in the ultraviolet, characteristic of conjugated diene groups. The results are tabulated belows:

| Reaction time, min. | Lesquerolate (by absorbance at 2.76 microns), percent of product | Conjugated $C_{20}$ dienoate (by absorbance at 231 m$\mu$), percent of product | Viscosity, stokes |
|---|---|---|---|
| 0 | 65 | 0 | 2.4 |
| 15 | 23.5 | 24 | |
| 30 | 21 | 23 | |
| 45 | 19 | 21 | |
| 60 | 18 | 24 | 1.4 |

In addition, a total of 2.8 grams of water were collected in the traps, an amount 81% of theoretical for complete dehydration.

Having thus described the invention, what is claimed is:

1. A composition comprising a mixture of esters of 11,13-eicosadienoic acid and 11,14-eicosadienoic acid with a hydroxy compound of the group consisting of alkanols, ethylene glycol, glycerine, pentaerythritol, and dipentaerythritol.

2. A composition comprising a mixture of the glycerides of 11,13-eicosadienoic acid and 11,14-eicosadienoic acid.

3. A method for dehydrating Lesquerella oil to produce glycerides of 11,13-eicosadienoic and 11,14-eicosadienoic acids which comprises placing sodium bisulphate in a vessel, adding thereto Lesquerella oil in an amount of about 100 times the weight of the sodium bisulphate, connecting the vessel to a source of vacuum to draw off water vapor as fast as it is formed, and heating the vessel and contents to a temperature of about 200–250° C. for a period of 15 minutes to one hour.

4. A method for dehydrating an ester of the group consisting of the alkyl, ethylene glycol, and glycerine esters of 14-hydroxy-11-eicosenoic acid to produce the corresponding esters of 11,13-eicosadienoic and 11,14-eicosadienoic acids, which comprises heating the said ester at a temperature of about 200 to 250° C. in the presence of an acidic dehydration catalyst selected from the group consisting of sulphuric acid and alkali metal bisulphates.

5. A method for dehydrating an ester of the group consisting of the alkyl, ethylene glycol, and glycerine esters of 14-hydroxy-11-eicosenoic acid to produce the corresponding esters of 11,13-eicosadienoic and 11,14-eicosadienoic acids, which comprises heating said ester at a temperature of about 200 to 250° C. in the presence of an alkali metal bisulphate while subjecting the reaction system to a source of vacuum to draw off water vapor as fast as it is formed.

6. A method for dehydrating Lesquerella oil to produce glycerine esters of 11,13-eicosadienoic and 11,14-eicosadienoic acids, which comprises heating Lesquerella oil at a temperature of about 200 to 250° C. in the presence of an alkali metal bisulphate while subjecting the reaction system to a source of vacuum to draw off water vapor as fast as it is formed.

No references cited.

CHARLES B. PARKER, *Primary Examiner.*

JOSEPH P. BRUST, *Assistant Examiner.*